W. BARNES.

Corn-Stalk Cutter.

No. 8,608. Reissued Mar. 4, 1879.

Witnesses:
M. H. Barringer,
P. R. Richards.

Inventor:
Wilson Barnes,
By W. B. Richards,
Atty.

N. PETERS, PHOTO-LITHOGRAPHER, WASHINGTON, D. C.

UNITED STATES PATENT OFFICE.

WILSON BARNES, OF MAQUOKETA, IOWA.

IMPROVEMENT IN CORN-STALK CUTTERS.

Specification forming part of Letters Patent No. 198,070, dated December 11, 1877; Reissue No. 8,608, dated March 4, 1879; application filed January 10, 1879.

*To all whom it may concern:*

Be it known that I, WILSON BARNES, of Maquoketa, in the county of Jackson and State of Iowa, have invented certain new and useful Improvements in Corn-Stalk Cutters; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

Figure 1:
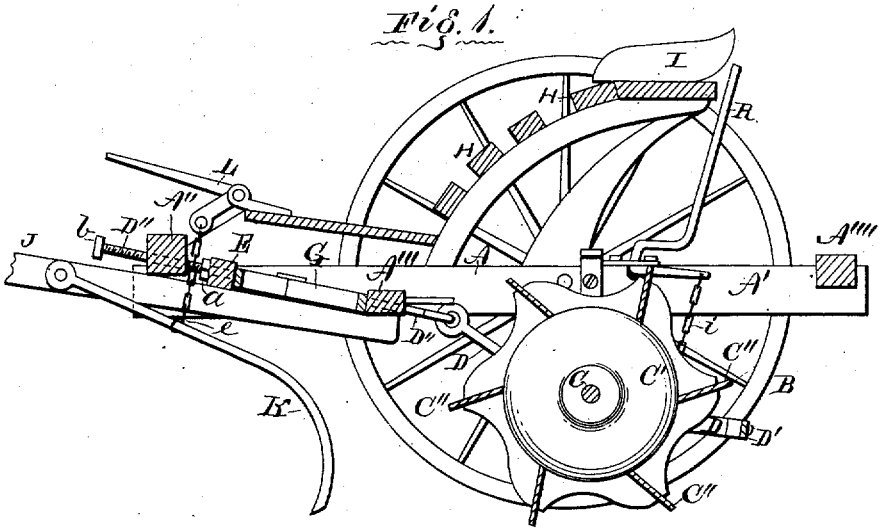
Figure 2:
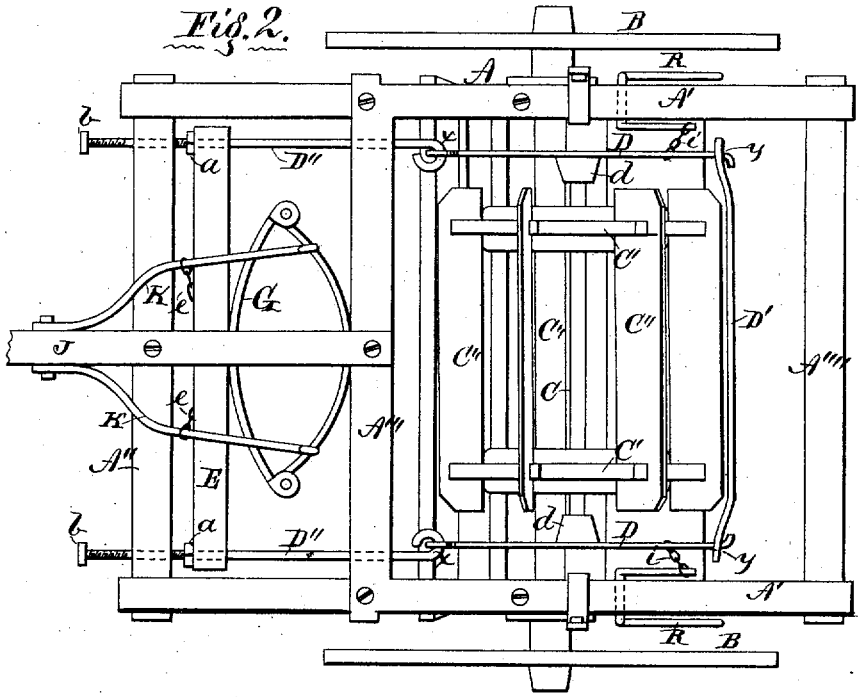

Figure 1 of the drawings is a longitudinal vertical sectional view of a stalk-cutter embodying my invention. Fig. 2 is a plan view of the same, seen from below.

The nature of my invention relates to machines for cutting corn-stalks or other stalks in the field into short lengths, to facilitate plowing them under, or for other purposes; and the invention consists, first, in the use of a yielding spring or springs, which connects the cylinder of cutters with the frame to which the draft-animals are attached in such manner that the cylinder of cutters is drawn by the draft-animals through the interposed yielding spring; secondly, in a cylinder of cutters journaled in a frame which is suspended by a hinge from a wheel-frame, to which it is connected by a spring or springs, through which the draft acts upon the cylinder of cutters; thirdly, in a cylinder of cutters connected with a wheel-frame by a spring or springs, the tension of which is adjustable to adapt it for adjusting the spring as required; fourthly, in a cylinder of cutters connected with a wheel-frame by a spring or springs and by draft-bars, which may be adjusted to prevent compression of the spring beyond limited extent, as desired.

The invention further consists in the construction and combination of parts, as hereinafter described and claimed.

Referring to the drawings by letters, the same letter indicating the same part in the different views, A represents the main frame of the machine, formed of side bars, A′, connected by transverse bars A″ A‴ A⁗, and provided on each side with a spindle, upon which a supporting-wheel, B, is journaled.

The cutter consists of a central shaft, C, on which are secured two heads, C′ C′, each of which has projecting lugs to which the cutting-blades C″ are secured, as shown in the drawings. The ends of the shaft C are journaled in bosses *d*, which project inwardly from two bars, D D. The bars D are connected at their rear ends by a cross-bar, D′, and at their front ends hinged each to a draw-bar, D″. The bars D″ pass loosely through the cross-bars A″ A‴ of the main frame or wheel-frame A, and also through a spring-bar, E, which is located between the bars A″ A‴. Between the spring-bar E and the bar A‴ of the main frame are interposed one or more springs, G, of any suitable form or material.

Nuts *a a* are placed on the draw-bars D″, in front of and against the spring-bar E, and other nuts, *b b*, are placed upon the ends of the drag-bars D″, which project in front of the bar A″, as shown in the drawings. The nuts *a a* are for the purpose of regulating the tension of the spring or springs G, by using them to adjust the bar E toward or from the bar A‴, to hold the spring G, respectively, in a more or less compressed condition, thereby adapting it to resist a greater or lesser draft on the cutters as produced in cutting different kinds of stalks and on different kinds of soil. Should the cutters become clogged or from other causes offer unusual resistance to advancing, the nuts *b* will be drawn back by the bars D″, and, striking the bar A″, will prevent a too great strain on the spring G.

The interposition of the spring or springs G between the frame which carries the cylinder of cutters and the main frame A, in such manner that the cutters are drawn by the springs, will prevent the jarring and jerking on the draft-animals arising from the sudden changes in resistance caused mainly by the chopping action of the cutter-blades as the machine advances. As the cylinder of cutters rolls forward on a preceding knife or blade, the resistance will be increased, and the spring G thereby compressed, and as the succeeding knife approaches the surface of the ground the resistance will be diminished and the compressed spring allowed by its resiliency to increase the chopping force of the knife.

The joints *x x*, between the arms D and draw-bars D″, and also between said arms and the cross-bar D′ at *y y*, are loose free-working joints, which allow the cutter to adjust itself to the surface of the ground.

The machine is covered with slats H, to prevent accidents, and the seat I is elevated to be out of the dust.

J is the tongue, made fast to the main frame, and provided on each side with a curved hook, K, for straightening the stalks and drawing them into line for the action of the cutters. These hooks are, by means of chains *e e*, connected with a foot-lever, L, by means of which they can be raised out of the ground when desired.

The cylinder of cutters may be raised above the ground by means of crank-levers R R—one on each side of the machine—connected by chains *i i* with the arms D, as shown in the drawings.

What I claim as new, and desire to secure by Letters Patent, is—

1. In a stalk-cutter, the combination, with a main frame to which the draft-animals are attached and with a cylinder of cutters, of a yielding spring or springs, located between the cylinder of cutters and the main frame, and connected therewith in such manner that the draft-animals draw the cylinder of cutters by the yielding spring, substantially as and for the purpose specified.

2. In combination with a main frame, A, a swinging frame and cylinder of cutters connected with the main frame by a yielding spring or springs, by which the cylinder of cutters is drawn, substantially as and for the purpose specified.

3. The nuts *a* and bars E D″, in combination with the main frame and the swinging cutter-frame, for adjusting the tension of the spring G, substantially as and for the purpose specified.

4. In combination with the cylinder-of-cutters frame, connected with the main frame by a spring or springs, G, the bars D″, projecting through a bar of the frame A, and having nuts *b* on their forward ends, as and for the purpose specified.

5. In combination with the cylinder of cutters and the main frame, and with the spring or springs G, adjustable draft-bars D″, by means of which a too great strain on the spring may be prevented, substantially as and for the purpose specified.

6. The combination, with the revolving cutter, of the draw-bars D″ D″, frame A, one or more springs, G, spring-bar E, and nuts *a a* and *b b* on the draw-bars, substantially as and for the purpose specified.

7. The combination, with the revolving cutter C C′ C″, of the arms D D, cross-bar D′, and draw-bars D″ D″, all connected together by loose joints to form a flexible frame, substantially as and for the purposes herein set forth.

In testimony that I claim the foregoing I have hereunto set my hand this 20th day of December, 1878.

WILSON BARNES.

Witnesses:
JAMES W. ATKINSON,
C. H. DEERE.